US012203352B2

(12) United States Patent
Sun et al.

(10) Patent No.: US 12,203,352 B2
(45) Date of Patent: Jan. 21, 2025

(54) METHOD FOR SHALE GAS PRODUCTION PREDICTION, DEVICE, AND STORAGE MEDIUM

(71) Applicant: CHINA UNIVERSITY OF PETROLEUM (EAST CHINA), Shandong (CN)

(72) Inventors: Hai Sun, Shandong (CN); Fei Luo, Shandong (CN); Dongyan Fan, Shandong (CN); Lei Zhang, Shandong (CN); Jun Yao, Shandong (CN); Shuaishi Fu, Shandong (CN); Kai Zhang, Shandong (CN); Yongfei Yang, Shandong (CN)

(73) Assignee: China University of Petroleum (East China), Shandong (CN)

( * ) Notice: Subject to any disclaimer, the term of this patent is extended or adjusted under 35 U.S.C. 154(b) by 0 days.

(21) Appl. No.: 18/426,597

(22) Filed: Jan. 30, 2024

(65) Prior Publication Data

US 2024/0289899 A1 Aug. 29, 2024

(30) Foreign Application Priority Data

Feb. 27, 2023 (CN) .......................... 202310167929.2

(51) Int. Cl.
*E21B 43/16* (2006.01)
*E21B 49/08* (2006.01)
(Continued)

(52) U.S. Cl.
CPC ............ *E21B 43/16* (2013.01); *E21B 49/087* (2013.01); *G01V 20/00* (2024.01); *G06Q 50/02* (2013.01); *E21B 2200/20* (2020.05)

(58) Field of Classification Search
USPC .......................................................... 702/6
See application file for complete search history.

(56) References Cited

U.S. PATENT DOCUMENTS 10,012,056 B1 * 7/2018 Lapierre ................. E21B 47/06
10,508,532 B1 * 12/2019 Mondal .................. E21B 47/00
(Continued)

FOREIGN PATENT DOCUMENTS

| CN | 105512758 A | 4/2016 |
| CN | 105954804 A | 9/2016 |

(Continued)

OTHER PUBLICATIONS

China National Intellectual Property Administration, First office action of Chinese application No. 202310167929.2 issued on Apr. 12, 2023, which is foreign counterpart application of this US application.

(Continued)

*Primary Examiner* — Paul D Lee
(74) *Attorney, Agent, or Firm* — Christensen O'Connor Johnson Kindness PLLC

(57) ABSTRACT

Provided is a method for shale gas production prediction, including: acquiring real shale gas production data, and determining a target production decline curve model according to the real shale gas production data; setting a time step for production prediction, and obtaining a linear production decline curve by performing production prediction by using the target production decline curve model based on the time step; determining target shale gas production residuals according to the linear production decline curve and the real shale gas production data, inputting the target shale gas production residuals to a long short-term memory, and obtaining a residual prediction result by performing production prediction according to the long short-term memory and the time step; and determining a target production prediction result of shale gas well to be subjected to production prediction based on the linear production decline curve and the residual prediction result.

8 Claims, 15 Drawing Sheets

(51) Int. Cl.
  *G01V 20/00* (2024.01)
  *G06Q 50/02* (2012.01)

(56) References Cited

U.S. PATENT DOCUMENTS

| | | | |
|---|---|---|---|
| 10,634,815 B1* | 4/2020 | Lapierre | G06F 17/18 |
| 11,767,750 B1* | 9/2023 | Sankaran | E21B 47/008 |
| | | | 166/250.01 |
| 2013/0346040 A1* | 12/2013 | Morales German | G06F 30/20 |
| | | | 703/2 |
| 2014/0297235 A1* | 10/2014 | Arora | G06N 7/01 |
| | | | 703/2 |
| 2018/0202264 A1* | 7/2018 | Sarduy | G06N 20/00 |
| 2018/0335538 A1* | 11/2018 | Dupont | G06F 17/18 |
| 2019/0024494 A1* | 1/2019 | Maher | G06N 3/02 |
| 2021/0010351 A1* | 1/2021 | Sun | G06N 3/045 |
| 2021/0183108 A1 | 6/2021 | Watson et al. | |
| 2021/0224669 A1* | 7/2021 | Chung | E21B 49/087 |
| 2022/0034208 A1* | 2/2022 | Garrett | E21B 47/10 |
| 2023/0111179 A1* | 4/2023 | Lam | E21B 49/087 |
| | | | 166/250.01 |

FOREIGN PATENT DOCUMENTS

| | | |
|---|---|---|
| CN | 108573076 A | 9/2018 |
| CN | 112488415 A | 3/2021 |
| CN | 112598194 A | 4/2021 |
| CN | 112761628 A | 5/2021 |
| CN | 114429231 A | 5/2022 |
| CN | 115204532 A | 10/2022 |

OTHER PUBLICATIONS

Xiao Liang et al., A New Method for Production Prediction of Heavy Oil Reservoirs Based on GRU Circulation Neural Network, Journal of Xi' an Shiyou University ( Natural Science Edition) vol. 35 No. 3, May 25, 2020, Entire document.

China National Intellectual Property Administration, Notification to grant patent right for invention of Chinese application No. 202310167929.2 issued on Apr. 28, 2023, which is foreign counterpart application of this US application.

* cited by examiner

METHOD FOR SHALE GAS PRODUCTION PREDICTION, DEVICE, AND STORAGE MEDIUM

CROSS-REFERENCE TO RELATED APPLICATIONS

This application claims priority to the Chinese Patent Application No. 202310167929.2, filed on Feb. 27, 2022 and entitled "METHOD AND APPARATUS FOR SHALE GAS PRODUCTION PREDICTION, DEVICE, AND STORAGE MEDIUM" the entire content of which is incorporated herein by reference.

TECHNICAL FIELD

The present disclosure relates to the field of oil-gas field development technologies, and particularly relates to a method and an apparatus for shale gas production prediction, a device, and a storage medium.

BACKGROUND

China is rich in shale gas resources, and it is of great significance to vigorously develop and fully utilize shale gas resources. In the process of shale gas development, the exploration effect can be tested through production prediction, which is beneficial to development deployment and planning. In the prior art, shale gas production is usually predicted using a production decline curve. A prediction result is linear and is a smooth curve, which may only represent a general trend of the production changing over time. However, the variation of the production mode and the influence of artificial operation lead the production curve to fluctuate over time in the actual production process, such that the production has in fact a non-linear relationship with the time. Due to the limitation of a basic model constructed using the production decline curve, fluctuations in an actual production curve cannot be predicted, which may lead to a deviation of a production prediction result to affect subsequent development deployment and planning. Therefore, how to predict the production of a shale gas well more accurately is a problem to be solved in the field of oil-gas field development.

SUMMARY

In view of this, the present disclosure aims to provide a method and apparatus for shale gas production prediction, a device, and a storage medium, wherein shale gas production prediction is performed by constructing a production decline curve and machine learning coupled model, and a final production prediction result is determined through prediction results of the production decline curve and the machine learning, which is beneficial to improving the effect of shale gas production prediction. The technical solutions are described as follows.

In a first aspect, the present disclosure provides a method for shale gas production prediction. The method includes:
    acquiring real shale gas production data of a shale gas well to be subjected to production prediction, and determining a target production decline curve model for production prediction of the shale gas well to be subjected to production prediction according to the real shale gas production data;
    setting a time step for production prediction of the shale gas well to be subjected to production prediction, and obtaining a linear production decline curve corresponding to the shale gas well to be subjected to production prediction by performing production prediction on the shale gas well to be subjected to production prediction by using the target production decline curve model based on the time step;
    determining target shale gas production residuals according to the linear production decline curve and the real shale gas production data, inputting the target shale gas production residuals into a long short-term memory, and obtaining a residual prediction result by performing production prediction according to the long short-term memory and the time step; and
    determining a target production prediction result of the shale gas well to be subjected to production prediction based on the linear production decline curve and the residual prediction result, and verifying the target production prediction result by using a preset test set corresponding to the shale gas well to be subjected to production prediction.

In some embodiments, determining the target production decline curve model for production prediction of the shale gas well to be subjected to production prediction according to the real shale gas production data includes:
    determining an initial production decline curve model for production prediction of the shale gas well to be subjected to production prediction according to the real shale gas production data, wherein a model parameter of the initial production decline curve model is a preset initial parameter; and
    fitting the real shale gas production data by using the initial production decline curve model based on the preset initial parameter of the initial production decline curve model, so as to determine a target model parameter according to a fitting result, and to determine the target production decline curve model corresponding to the target model parameter.

In some embodiments, prior to determining the target shale gas production residuals according to the linear production decline curve and the real shale gas production data, the method further includes:
    determining a real shale gas production curve based on the initial production decline curve model and the real shale gas production data of the shale gas well to be subjected to production prediction, so as to determine the target shale gas production residuals according to the linear production decline curve and the real shale gas production curve.

In some embodiments, inputting the target shale gas production residuals into the long short-term memory includes:
    standardizing the target shale gas production residuals and inputting the standardized target shale gas production residuals into the long short-term memory; and
    correspondingly, obtaining the residual prediction result by performing production prediction according to the long short-term memory and the time step includes:
    obtaining an initial prediction result by performing production prediction according to the long short-term memory and the time step, and obtaining the residual prediction result by anti-standardizing the initial prediction result.

In some embodiments, upon inputting the target shale gas production residuals into the long short-term memory, the method further includes:
    setting initial values of the number of hidden units and the number of training rounds of a corresponding model of the long short-term memory, so as to obtain the residual prediction result by performing production prediction according to the corresponding model of the long-short memory and the time step.

In some embodiments, obtaining the residual prediction result by performing production prediction according to the long short-term memory and the time step includes:

fitting the target shale gas production residuals according to the long short-term memory, and adjusting a memory parameter corresponding to the long short-term memory according to a residual fitting result; and determining the adjusted long short-term memory based on the adjusted memory parameter, and obtaining the residual prediction result by performing production prediction according to the adjusted long short-term memory and the time step.

In some embodiments, determining the target production prediction result of the shale gas well to be subjected to production prediction based on the linear production decline curve and the residual prediction result includes:

obtaining the target production prediction result of the shale gas well to be subjected to production prediction by summing a linear prediction result corresponding to the linear production decline curve and a nonlinear prediction result corresponding to the residual prediction result.

In a second aspect, the present disclosure provides an apparatus for shale gas production prediction. The apparatus includes:

a model determining module, configured to acquire real shale gas production data of a shale gas well to be subjected to production prediction, and determine a target production decline curve model for production prediction of the shale gas well to be subjected to production prediction according to the real shale gas production data;

a first production prediction module, configured to set a time step for production prediction of the shale gas well to be subjected to production prediction, and obtain a linear production decline curve corresponding to the shale gas well to be subjected to production prediction by performing production prediction on the shale gas well to be subjected to production prediction by using the target production decline curve model based on the time step;

a second production prediction module, configured to determine target shale gas production residuals according to the linear production decline curve and the real shale gas production data, input the target shale gas production residuals into a long short-term memory, and obtain a residual prediction result by performing production prediction according to the long short-term memory and the time step; and a prediction result determining module, configured to determine a target production prediction result of the shale gas well to be subjected to production prediction based on the linear production decline curve and the residual prediction result, and verify the target production prediction results by using a preset test set corresponding to the shale gas well to be subjected to production prediction.

In a third aspect, the present disclosure provides an electronic device. The electronic device includes a processor and a memory configured to store one or more computer programs, wherein the one or more computer programs, when loaded and executed by the processor, cause the processor to perform the above-mentioned method for shale gas production prediction.

In a fourth aspect, the present disclosure provides a computer-readable storage medium storing one or more computer programs therein, wherein the one or more computer programs, when loaded by a processor, cause the processor to perform the above-mentioned method for shale gas production prediction.

According to the present disclosure, firstly, the real shale gas production data of the shale gas well to be subjected to production prediction is acquired, and the target production decline curve model for production prediction of the shale gas well to be subjected to production prediction is determined according to the real shale gas production data; the time step for production prediction of the shale gas well to be subjected to production prediction is set, and the linear production decline curve corresponding to the shale gas well to be subjected to production prediction is obtained by performing production prediction on the shale gas well to be subjected to production prediction by using the target production decline curve model based on the time step; the target shale gas production residuals are determined according to the linear production decline curve and the real shale gas production data, the target shale gas production residuals are input into the long short-term memory, and the residual prediction result is obtained by performing production prediction according to the long short-term memory and the time step; and finally, the target production prediction result of the shale gas well to be subjected to production prediction is determined based on the linear production decline curve and the residual prediction result, and the target production prediction result is verified by using the preset test set. It can be seen that in the present disclosure, the production decline curve is used to predict the linear trend of production to calculate the residuals between the production decline curve and the real data, and then the long short-term memory (LSTM) is used to predict the residuals that characterize the nonlinear fluctuations. The final production prediction result is obtained by performing shale gas production prediction by constructing the production decline curve and machine learning coupled model, which is beneficial to improving the effect of shale gas production prediction.

BRIEF DESCRIPTION OF DRAWINGS

For clearer descriptions of the technical solutions in the embodiments of the present disclosure or the prior art, the following briefly introduces the accompanying drawings required for describing the embodiments or the prior art. Apparently, the accompanying drawings in the following description show merely the embodiments of the present disclosure, and a person of ordinary skill in the art may still derive other drawings from these accompanying drawings without creative efforts.

DETAILED DESCRIPTION

The technical solutions in the embodiments of the present disclosure are described clearly and completely hereinafter with reference to the accompanying drawings in the embodiments of the present disclosure. It is obvious that the described embodiments are only part of the embodiments of the present disclosure, rather than all of the embodiments. All other embodiments obtained by those of ordinary skill in the art without creative efforts based on the embodiments in the present disclosure are within the protection scope of the present disclosure.

In the process of shale gas development, the exploration effect can be tested through production prediction, which is beneficial to development deployment and planning. In the prior art, shale gas production is usually predicted using a production decline curve, while fluctuations in an actual production curve cannot be predicted, which may lead to a deviation of a production prediction result to affect subsequent development deployment and planning. Therefore, the present disclosure performs shale gas production prediction by constructing a production decline curve and machine learning coupled model, which is beneficial to improving the effect of shale gas production prediction.

Figure 1:
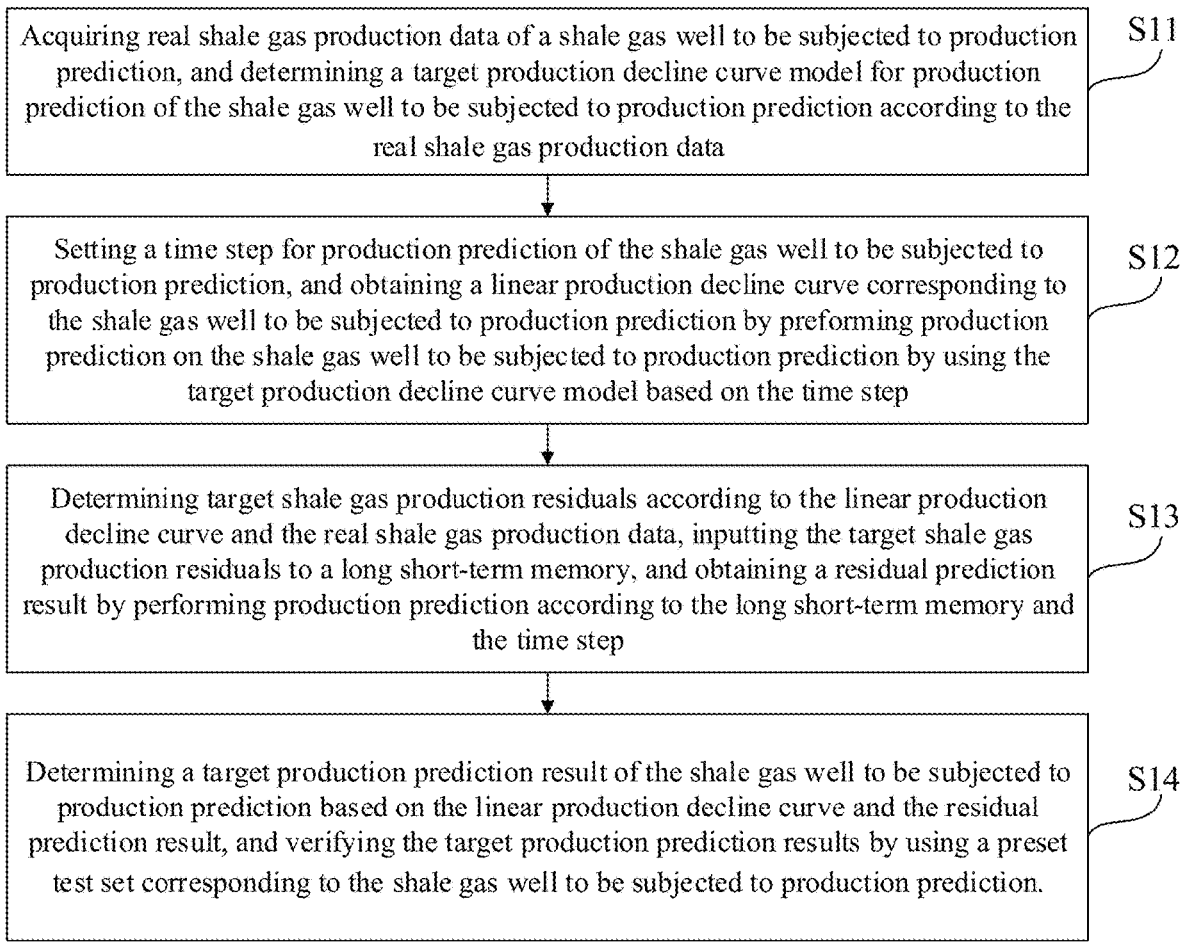
FIG. 1 is a flowchart of a method for shale gas production prediction according to some embodiments of the present disclosure.

Referring to FIG. 1, the embodiments of the present disclosure disclose a method for shale gas production prediction. The method includes the following steps.

In S11, real shale gas production data of a shale gas well to be subjected to production prediction is acquired, and a target production decline curve model for production prediction of the shale gas well to be subjected to production prediction is determined according to the real shale gas production data.

In the embodiments, firstly, the shale gas well to be subjected to production prediction is selected, and the real shale gas production data corresponding to the shale gas well to be subjected to production prediction is determined, wherein the determined real shale gas production data includes but is not limited to the shale gas production of the shale gas well to be subjected to production prediction corresponding to each of several years. Then, the corresponding target production decline curve model for production prediction of the shale gas well to be subjected to production prediction is selected according to the determined real shale gas production data. It can be understood that a plurality of decline curve models can be selected in the embodiments to perform production prediction on the shale gas well to be subjected to production prediction at the same time, for example, a Duong decline model, an Arps exponential decline model, an Arps hyperbolic decline model, and a PLE decline model are selected for production prediction. Prediction using the plurality of decline curve models at the same time is beneficial to determining a more suitable curve model during prediction, and determining a production prediction error based on a plurality of prediction results is beneficial to improving the accuracy of shale gas production prediction.

In S12, a time step for production prediction of the shale gas well to be subjected to production prediction is set, and a linear production decline curve corresponding to the shale gas well to be subjected to production prediction is obtained by performing production prediction on the shale gas well to be subjected to production prediction by using the target production decline curve model based on the time step.

In the embodiments, the time step for production prediction is set according to different actual demands, and production prediction is performed on the shale gas well to be subjected to production prediction based on the time step to obtain a linear trend of corresponding production of the shale gas well to be subjected to production prediction. For example, the annual production of shale gas within five years of the shale gas well to be subjected to production prediction is obtained, and a time step of ten years is set for annual production prediction. Production prediction is performed on the shale gas well to be subjected to production prediction by using the target production decline curve model determined in the above-mentioned step to obtain a trend of the production of the shale gas well with time, such that nonlinear fluctuation prediction of the shale gas production is performed subsequently using a long short-term memory based on the obtained linear production decline curve.

In S13, target shale gas production residuals are determined according to the linear production decline curve and the real shale gas production data, the target shale gas production residuals are input into the long short-term memory, and a residual prediction result is obtained by performing production prediction according to the long short-term memory and the time step.

In the embodiments, the production residuals between the predicted shale gas production and the real shale gas production data are calculated according to the linear production decline curve obtained in S12, and are input into the long short-term memory; and then production prediction is performed using the long short-term memory based on the time step determined in the foregoing step to obtain the residual prediction result. It can be understood that the long short-term memory has a strong mapping capability to nonlinear data in a machine learning method, the result of production prediction using the LSTM model based on the linear production decline curve is more accurate than that of production prediction only using a decline curve model, and nonlinear fluctuations of shale gas production can be predicted by using the LSTM model, which improves the accuracy of shale gas production prediction.

In S14, a target production prediction result of the shale gas well to be subjected to production prediction is determined based on the linear production decline curve and the residual prediction result, and the target production prediction result is verified by using a preset test set corresponding to the shale gas well to be subjected to production prediction.

In the embodiments, a linear prediction result corresponding to the linear production decline curve and a nonlinear prediction result corresponding to the residual prediction result are summed to obtain the target production prediction result of the shale gas well to be subjected to production prediction determined by a coupled model. Then the target production prediction result is verified by using a preset test set corresponding to the shale gas well to be subjected to production prediction. The shale gas well to be subjected to production prediction may be divided into a training set and the test set in advance, such that the prediction result is verified by using the shale gas well corresponding to the test set after the long short-term memory is trained by using the shale gas well corresponding to the training set.

Figure 2:
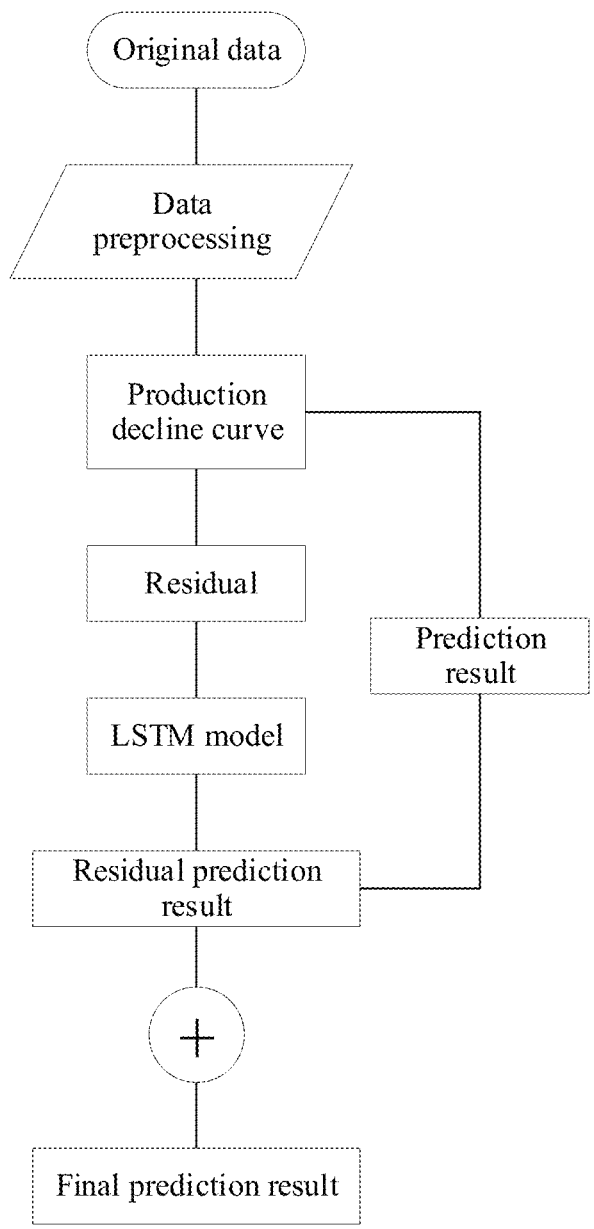
FIG. 2 is a structural diagram of a shale gas production prediction coupled model according to some embodiments of the present disclosure.

As shown in FIG. 2, which is a structural diagram of a shale gas production prediction coupled model according to some embodiments of the present disclosure, original data of the shale gas well to be subjected to production prediction is acquired and preprocessed, and then a production decline curve is determined based on a production decline curve model to obtain a linear prediction result; and then production residuals are calculated by using the determined production decline curve and actual production of the shale gas well, a residual prediction result (i.e., nonlinear prediction result) is determined by an LSTM model, and a final prediction result is obtained by summing the nonlinear prediction result and the linear prediction result.

It can be seen that according to the present disclosure, firstly, the real shale gas production data of the shale gas well to be subjected to production prediction is acquired, and the target production decline curve model for production prediction of the shale gas well to be subjected to production prediction is determined according to the real shale gas production data; the time step for production prediction of the shale gas well to be subjected to production prediction is set, and the linear production decline curve corresponding to the shale gas well to be subjected to production prediction is obtained by performing production prediction on the shale gas well to be subjected to production prediction by using the target production decline curve model based on the time step; the target shale gas production residuals are determined according to the linear production decline curve and the real shale gas production data, the target shale gas production residuals are input into the long short-term memory, and the residual prediction result is obtained by performing production prediction according to the long short-term memory and the time step; and finally, the target production prediction result of the shale gas well to be subjected to production prediction is determined based on the linear production decline curve and the residual prediction result. It can be seen that in the present disclosure, the production decline curve is used to predict the linear trend of production to calculate the residuals between the production decline curve and the real data, and then the long short-term memory (LSTM) is used to predict the residuals that characterize the nonlinear fluctuations. The final production prediction result is obtained by performing shale gas production prediction by constructing the production decline curve and machine learning coupled model, which is beneficial to improving the effect of shale gas production prediction.

Figure 3:
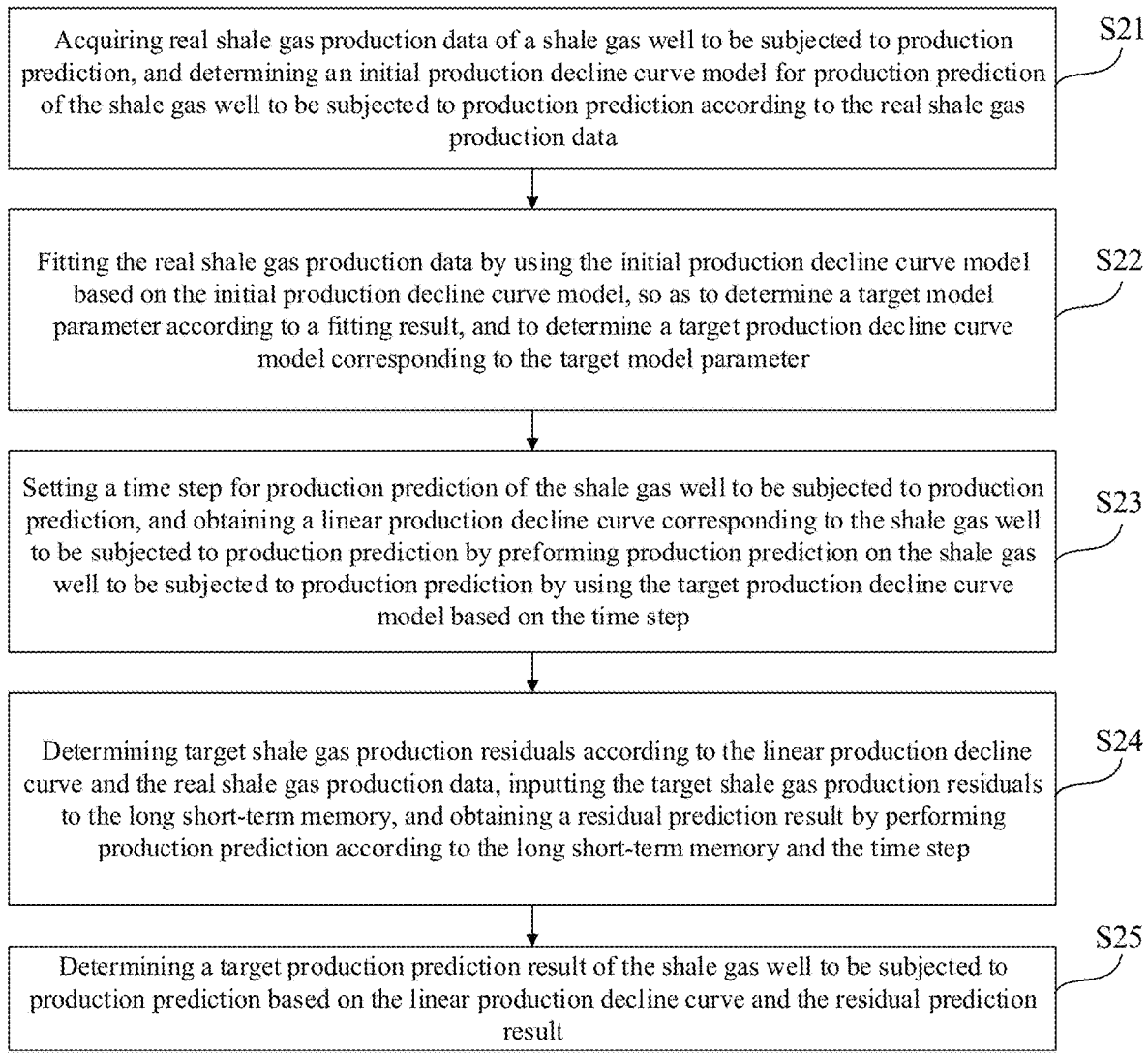
FIG. 3 is a flowchart of a specific method for shale gas production prediction according to some embodiments of the present disclosure.

Based on the previous embodiments, it can be seen that the final production prediction result can be determined by constructing the production decline curve and machine learning coupled model in the present disclosure. Next, the process of prediction using the production decline curve is described in detail in the embodiments. As shown in FIG. 3, the embodiment of the present disclosure discloses a method for shale gas production prediction. The method includes the following steps.

In S21, real shale gas production data of a shale gas well to be subjected to production prediction is acquired, and an initial production decline curve model for production prediction of the shale gas well to be subjected to production prediction is determined according to the real shale gas production data.

In the embodiments, after the real shale gas production data of shale gas well to be subjected is acquired, a production decline curve model to be used is determined firstly according to the acquired real shale gas production data, and an initial model parameter of the decline curve model is set to obtain an initial production decline curve model.

In S22, the real shale gas production data is fitted by using the initial production decline curve model based on the initial production decline curve model, so as to determine a target model parameter according to a fitting result, and to determine a target production decline curve model corresponding to the target model parameter.

In the embodiments, a curve of production varying with time corresponding to the shale gas well to be subjected to production prediction is made according to the initial production decline curve model; the real production data of the shale gas well is fitted based on the curve; the preset parameter in the initial production decline curve model is adjusted according to an obtained data fitting result; and the adjustment is stopped when the production decline curve model reaches the best fitting data effect, so as to obtain the target production decline curve model. By adjusting the parameter of the production decline curve model through data fitting, the result of production prediction can be more accurate and the effect of production prediction can be improved.

In S23, a time step for production prediction of the shale gas well to be subjected to production prediction is set, and a linear production decline curve corresponding to the shale gas well to be subjected to production prediction is obtained by performing production prediction on the shale gas well to be subjected to production prediction by using the target production decline curve model based on the time step.

In S24, target shale gas production residuals are determined according to the linear production decline curve and the real shale gas production data, the target shale gas production residuals are input into the long short-term memory, and a residual prediction result is obtained by performing production prediction according to the long short-term memory and the time step.

In the embodiments, a real shale gas production curve is determined based on the initial production decline curve model and the real shale gas production data of the shale gas well to be subjected to production prediction, and the shale gas production residuals are obtained according to the linear production decline curve and the real shale gas production curve, so as to obtain the residual prediction result.

In S25, a target production prediction result of the shale gas well to be subjected to production prediction is determined based on the linear production decline curve and the residual prediction result.

A more specific processing process of the above steps S23 and S25 may refer to the corresponding content disclosed in the above-mentioned embodiments, and will not be repeated here.

It can be seen that in the embodiments, the real shale gas production data of the shale gas well to be subjected to production prediction is acquired, and the initial production decline curve model for production prediction of the shale gas well to be subjected to production prediction is determined according to the real shale gas production data; the real shale gas production data is fitted by using the initial production decline curve model based on the initial production decline curve model, so as to determine the target model parameter according to the fitting result, and to determine the target production decline curve model corresponding to the target model parameter; and the time step is set, the linear production decline curve of the shale gas well to be subjected to production prediction is obtained based on the time step, and the target shale gas production residuals are determined further according to the linear production decline curve and the real shale gas production data, so as to perform production prediction according to the long short-term memory to obtain the residual prediction result, and then to determine the target production prediction result of the shale gas well to be subjected to production prediction. In this way, the parameter of the production decline curve model can be adjusted through data fitting, such that the result of production prediction can be more accurate and the effect of production prediction can be improved.

Figure 4:
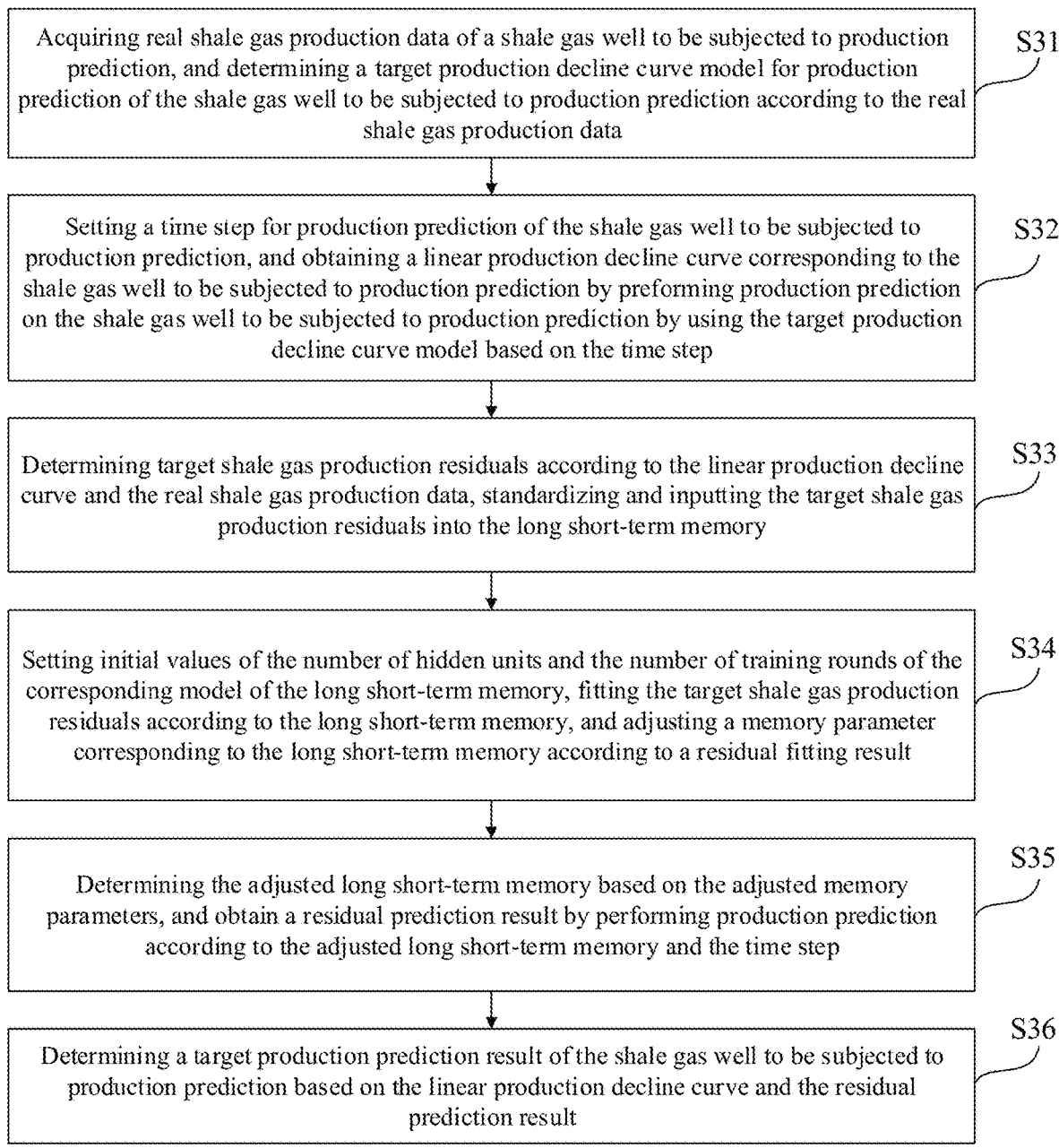
FIG. 4 is a flowchart of a specific method for shale gas production prediction according to some embodiments of the present disclosure.

Based on the previous embodiments, it can be seen that the final production prediction result can be determined by constructing the production decline curve and machine learning coupled model in the present disclosure. Next, a process of prediction using the long short-term memory is described in detail in the embodiments. As shown in FIG. 4, the embodiments of the present disclosure discloses a method for shale gas production prediction. The method includes the following steps.

In S31, real shale gas production data of shale gas well to be subjected to production prediction is acquired, and a target production decline curve model for production prediction of the shale gas well to be subjected to production prediction is determined according to the real shale gas production data.

In S32, a time step for production prediction of the shale gas well to be subjected to production prediction is set, and a linear production decline curve corresponding to the shale gas well to be subjected to production prediction is obtained by performing production prediction on the shale gas well to be subjected to production prediction by using the target production decline curve model based on the time step.

In S33, target shale gas production residuals are determined according to the linear production decline curve and the real shale gas production data, and the target shale gas production residuals are standardized and input into the long short-term memory.

In the embodiments, after being obtained, the target shale gas production residuals are standardized and then input into the long short-term memory. It can be understood that the methods for standardizing residual data in the embodiments include, but are not limited to, processing methods such as Min-Max standardization, standard deviation standardization, and nonlinear normalization. Through standardization of the residual data, the data can be balanced to speed up the processing and reduce calculation errors that may be caused by extreme values, so as to improve the prediction effect.

In S34, initial values of the number of hidden units and the number of training rounds of the corresponding model of the long short-term memory are set, the target shale gas production residuals are fitted according to the long short-term memory, and a memory parameter corresponding to the long short-term memory is adjusted according to a residual fitting result.

In the embodiments, firstly an LSTM network architecture is constructed and training options are specified, and it can be understood that the construction of the LSTM network architecture includes the following four parts: a sequence input layer, an LSTM layer, a fully connected layer, and a regression layer, and settings of the LSTM network architecture are shown in Table 1; and Table 2 lists the types and parameter settings of LSTM training options.

TABLE 1

| Model Architecture | Parameters |
| --- | --- |
| Sequence Input Layer | Dimension of Input Data |
| LSTM Layer | Obtained by Optimization |
| Fully Connected Layer | Dimension of Output Data |
| Regression Layer | Null |

TABLE 2

| Options | Parameters |
| --- | --- |
| Solver | Adam |
| Maximum Number of Training Rounds | Obtained by Optimization |
| Sequence Filling Direction | Left |
| Shuffle | every-epoch |
| Plots | "training-progress" |
| Verbose | 0 |

After the LSTM is constructed based on the parameter settings, initial values of the number of hidden units and the number of training rounds of the corresponding model of the long short-term memory are set, the target shale gas production residuals are fitted according to the long short-term memory, and memory parameters corresponding to the long short-term memory are adjusted according to a residual fitting result. By adjusting the parameters of the long short-term memory through data fitting, the result of production prediction can be more accurate and the effect of production prediction can be improved.

In S35, the adjusted long short-term memory is determined based on the adjusted memory parameters, and a residual prediction result is obtained by performing production prediction according to the adjusted long short-term memory and the time step.

In the embodiments, after the time step is set, production prediction is performed based on the adjusted long short-term memory, and a prediction result is anti-standardized to obtain a nonlinearly fluctuating residual prediction result.

In S36, a target production prediction result of the shale gas well to be subjected to production prediction is determined based on the linear production decline curve and the residual prediction result.

A more specific processing process of the above steps S31, S32, and S36 may refer to the corresponding content disclosed in the above-mentioned embodiments, and will not be repeated here.

It can be seen that in the embodiments, production prediction is performed by using the target production decline curve to obtain the linear production decline curve corresponding to the shale gas well to be subjected to production prediction; the target shale gas production residuals are determined according to the linear production decline curve, and the target shale gas production residuals are standardized and then input into the long short-term memory; after the initial values of the number of the hidden units and the number of the training rounds of the corresponding model of the long short-term memory are set, the target shale gas production residuals are fitted according to the long short-term memory, and the memory parameters corresponding to the long short-term memory are adjusted according to the residual fitting results; and the adjusted long-short-term memory is determined based on the adjusted memory parameters, production prediction is preformed according to the adjusted long-short-term memory and the time step to obtain the residual prediction result, and then the target production prediction result of the shale gas well to be subjected to production prediction is determined. Through standardization of the residual data, the data can be balanced to speed up the processing; and the parameters of the long short-term memory are adjusted through residual fitting, which can make the results of production prediction more accurate and improve the effect of production prediction.

As shown in FIGS. 5 to 14, the present disclosure discloses a method for shale gas production prediction based on the production decline curve and machine learning coupled models in combination with the following specific embodiments. The method includes the following steps.

In the embodiments, the production time of a selected shale gas well is 590 days, and the selected shale gas well is divided into a training set and a test set according to the ratio of 9:1, with the first 90% being the training set and the last 10% being the test set.

Figure 5:
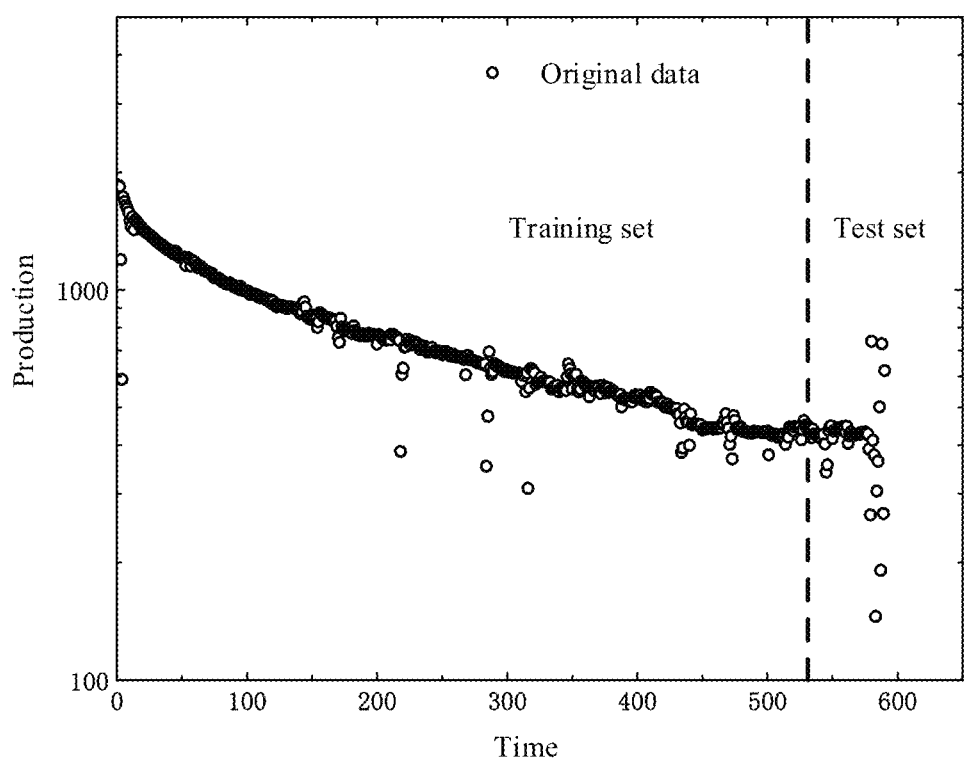
FIG. 5 is an original production data graph of a shale gas well according to some embodiments of the present disclosure.

The production decline curve models to be used are selected, and the initial parameters of the models are preset. In the embodiments, a production curve of the selected shale gas well is shown in FIG. 5; a Duong decline model, an Arps exponential decline model, an Arps hyperbolic decline model, and a PLE decline model are selected to perform production prediction respectively; and relational expressions of production varying with time of the four models are shown below.

The relational expression of the Duong decline model is:

$$q(t) = q_i t^{-m} e^{\left[\frac{a}{1-m}(t^{1-m}-1)\right]}.$$

In the above formula, $q_i$ is initial production in m³/d; a is a double logarithmic curve intercept in d⁻¹; and m is a double logarithmic curve slope.

The relational expression of the Arps exponential decline model is:

$$q(t) = q_i e^{-D_i t}.$$

In the above formula, $D_i$ is an initial decline rate in d⁻¹.

The relational expression of the Arps hyperbolic decline model is:

$$q(t) = q_i(1 + bD_i t)^{-1/b}.$$

In the above formula, $D_i$ is an initial decline rate in d⁻¹; and b is a decline exponent.

The relational expression of the PLE decline model is:

$$q(t) = q_i \exp(-D_\infty - D_i t^n).$$

In the above formula, $$D_i = \frac{D_1}{n}; D_\infty$$

is a decline rate in d⁻¹ corresponding to infinite time; $D_1$ is an Arps line decline rate corresponding to a first time period; and n is a time exponent.

Figure 6:
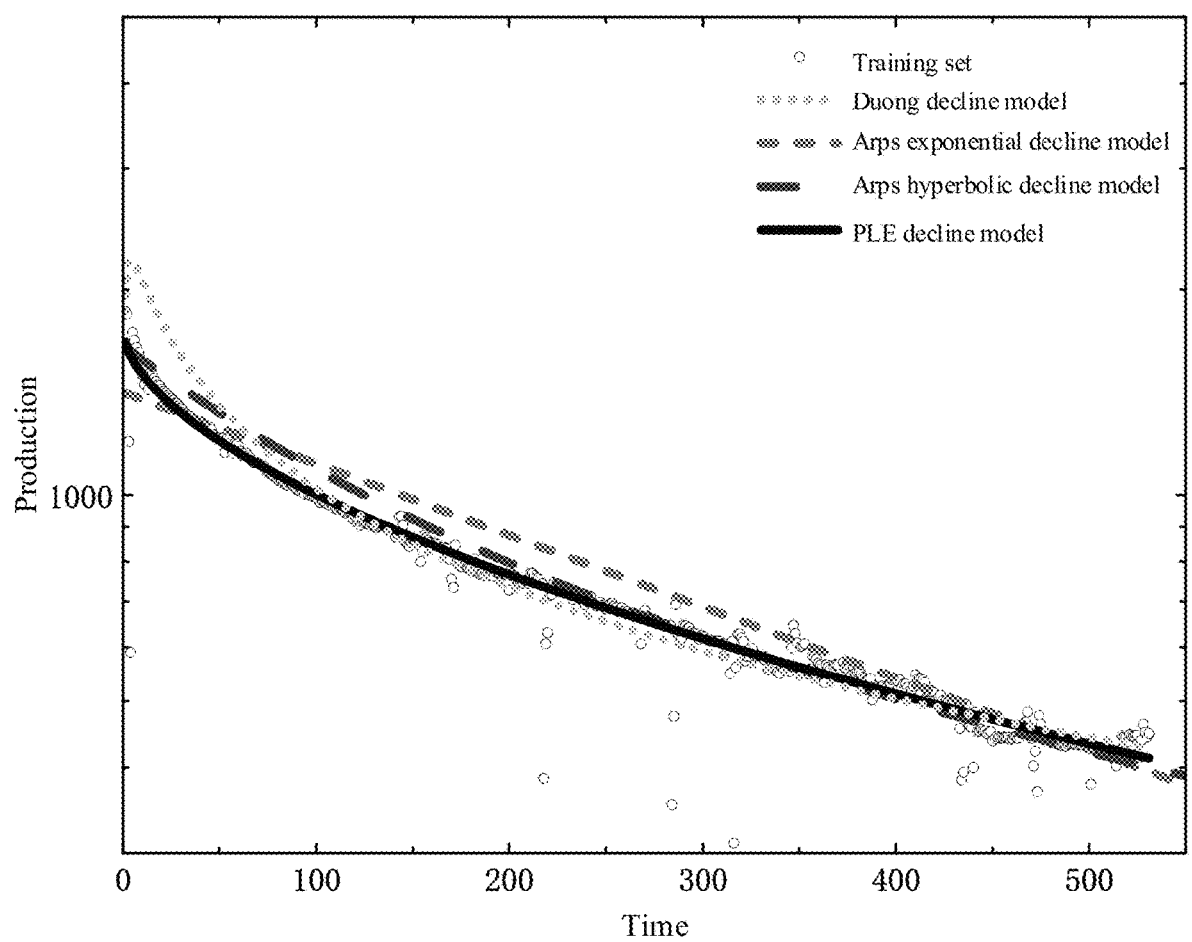
FIG. 6 is a best-fitting graph of production decline curve models according to some embodiments of the present disclosure.
Figure 7:
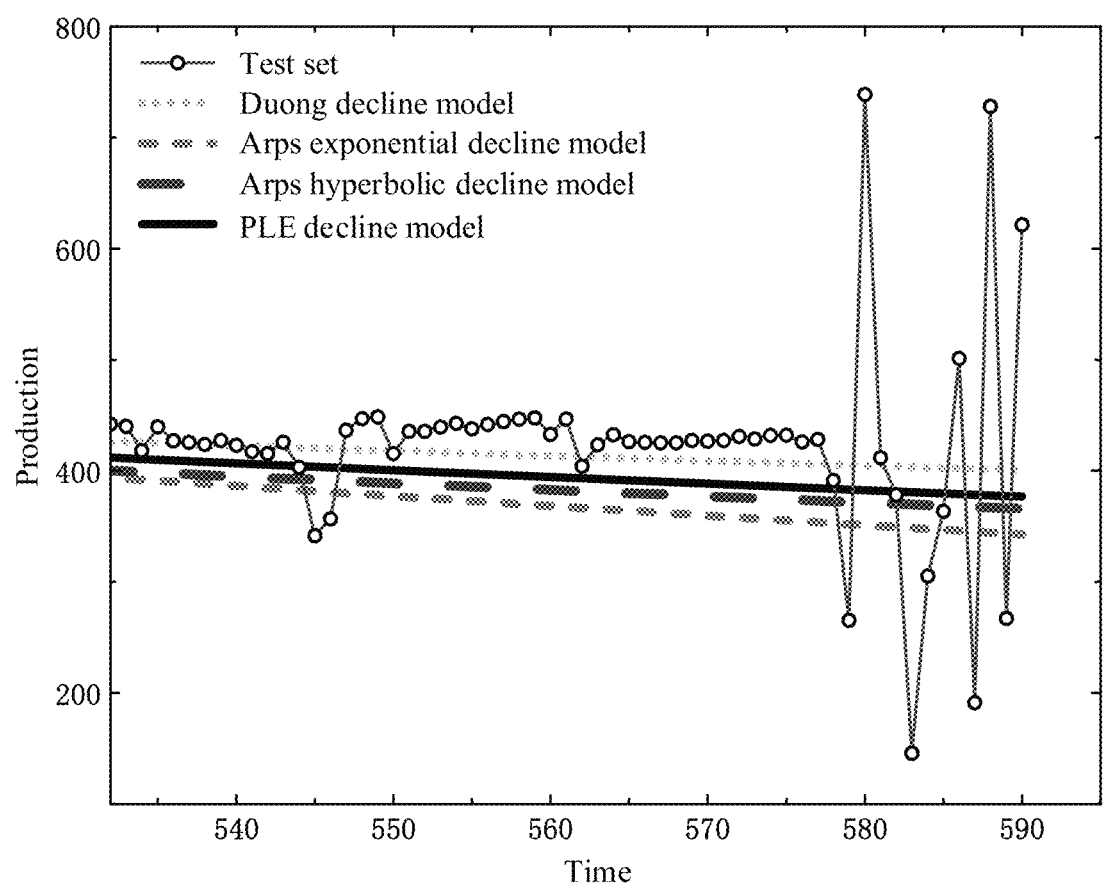
FIG. 7 is a graph of test results of a test set for production decline curves according to some embodiments of the present disclosure.

Curves are made according to the relational expressions of production varying with time of the selected models, production data of the selected shale gas well is fitted by using the curves, and the parameters are adjusted to achieve the best fitting effect. The best-fitting parameters of the four models are shown in Table 3, and the best-fitting results are shown in FIG. 6. The exact relation expression of each model is obtained according to the best-fitting results and is tested with the test set, with the results shown in FIG. 7; and prediction errors that are obtained by prediction using the production decline curves are shown in Table 4.

TABLE 3

| Model | Optimal Parameters |
| --- | --- |
| Duong Decline Model | a = 1.047; m = 1.037 |
| Arps Exponential Decline Model | $D_i$ = 2.413 × 10⁻³ |
| Arps Hyperbolic Decline Model | b = 0.800; $D_i$ = 5.021 × 10⁻³ |
| PLE Decline Model | $D_\infty$ = 1.159 × 10−3; $D_i$ = 0.042; n = 0.557 |

TABLE 4

| Model | Average Relative Error |
| --- | --- |
| Duong Decline Model | 13.54% |
| Arps Exponential Decline Model | 18.94% |
| Arps Hyperbolic Decline Model | 17.07% |
| PLE Decline Model | 15.43% |

Figure 8:
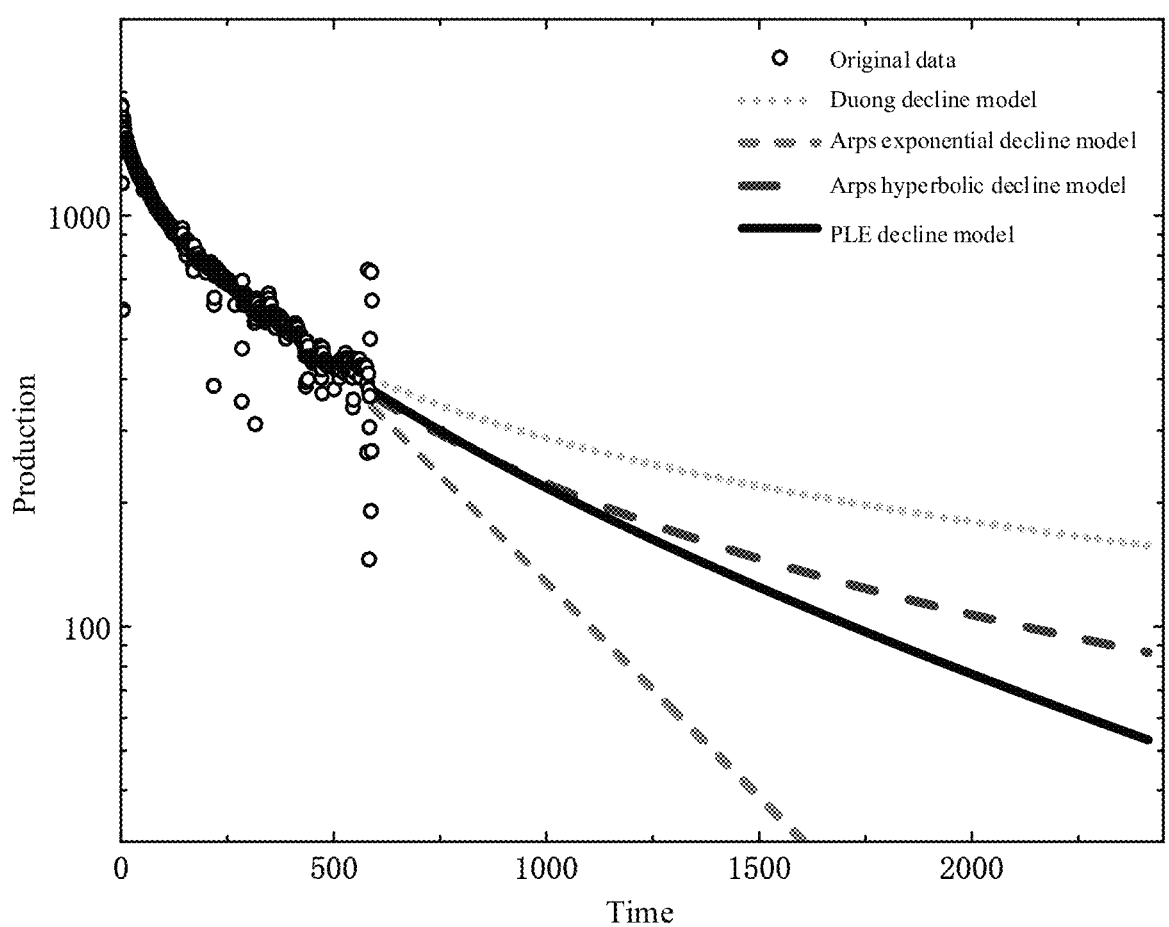
FIG. 8 is a graph of five-year prediction results of production decline curves according to some embodiments of the present disclosure.
Figure 9:
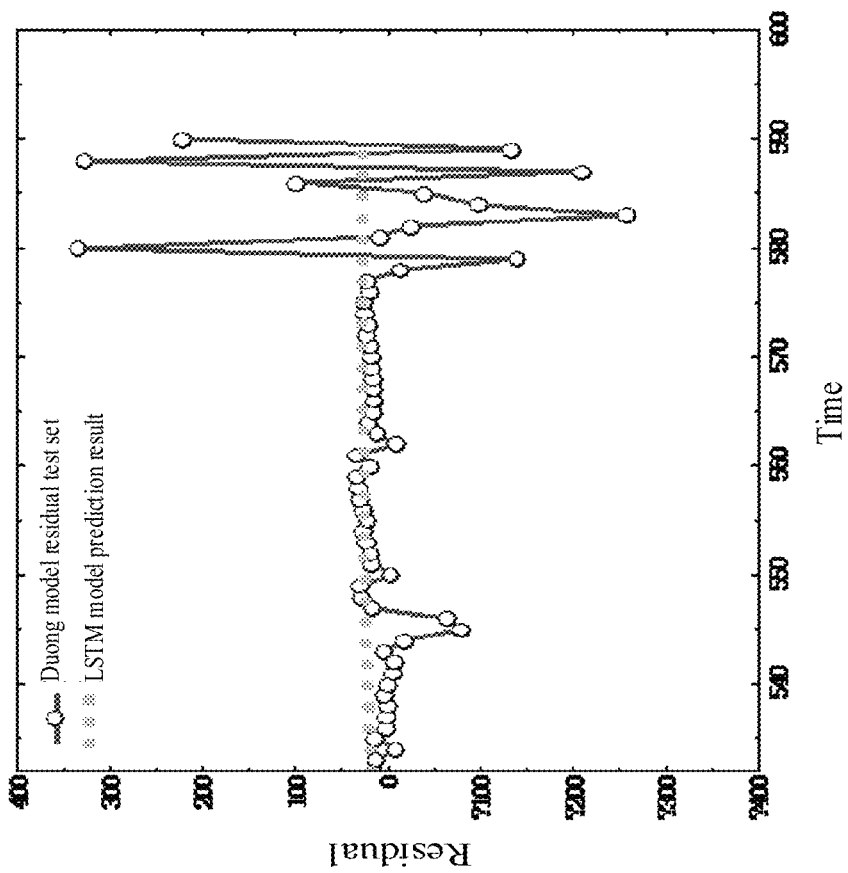
FIG. 9 is a graph of a residual prediction result of a Duong model according to some embodiments of the present disclosure.
Figure 9:
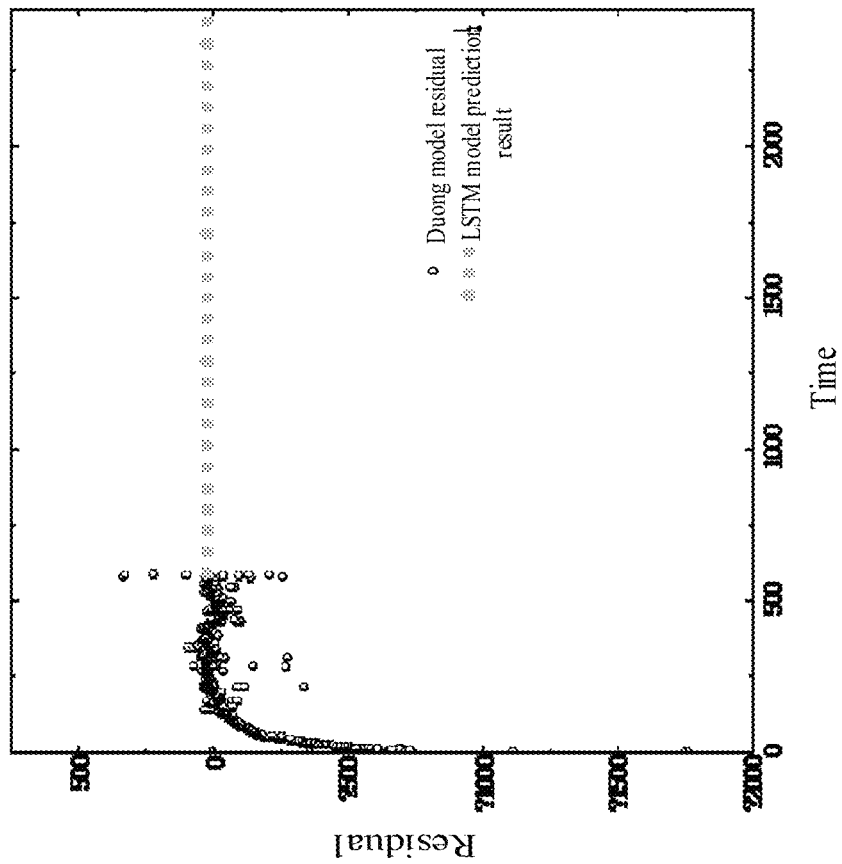
Figure 10:
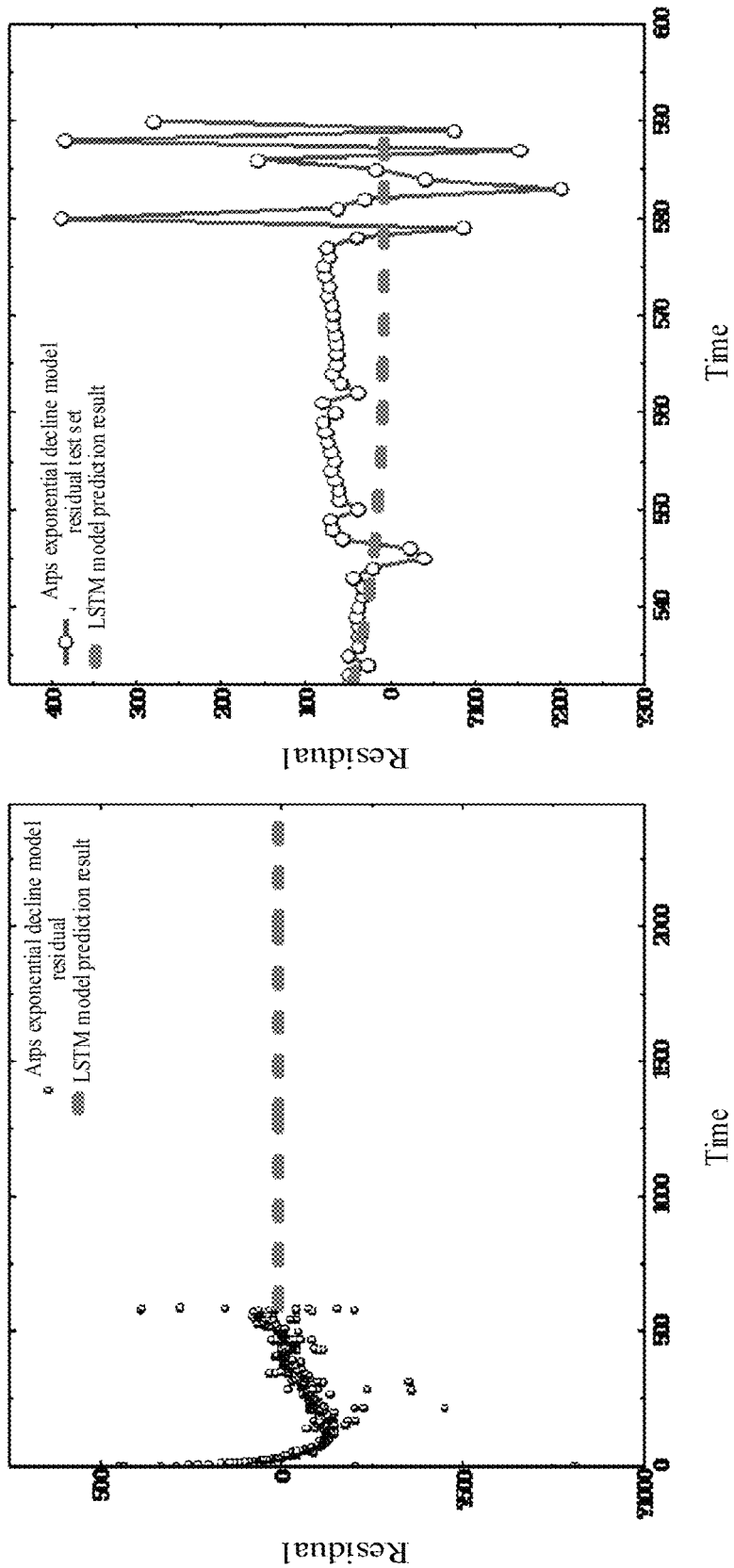
FIG. 10 is a graph of a residual prediction result of an Arps exponential decline model according to some embodiments of the present disclosure.
Figure 11:
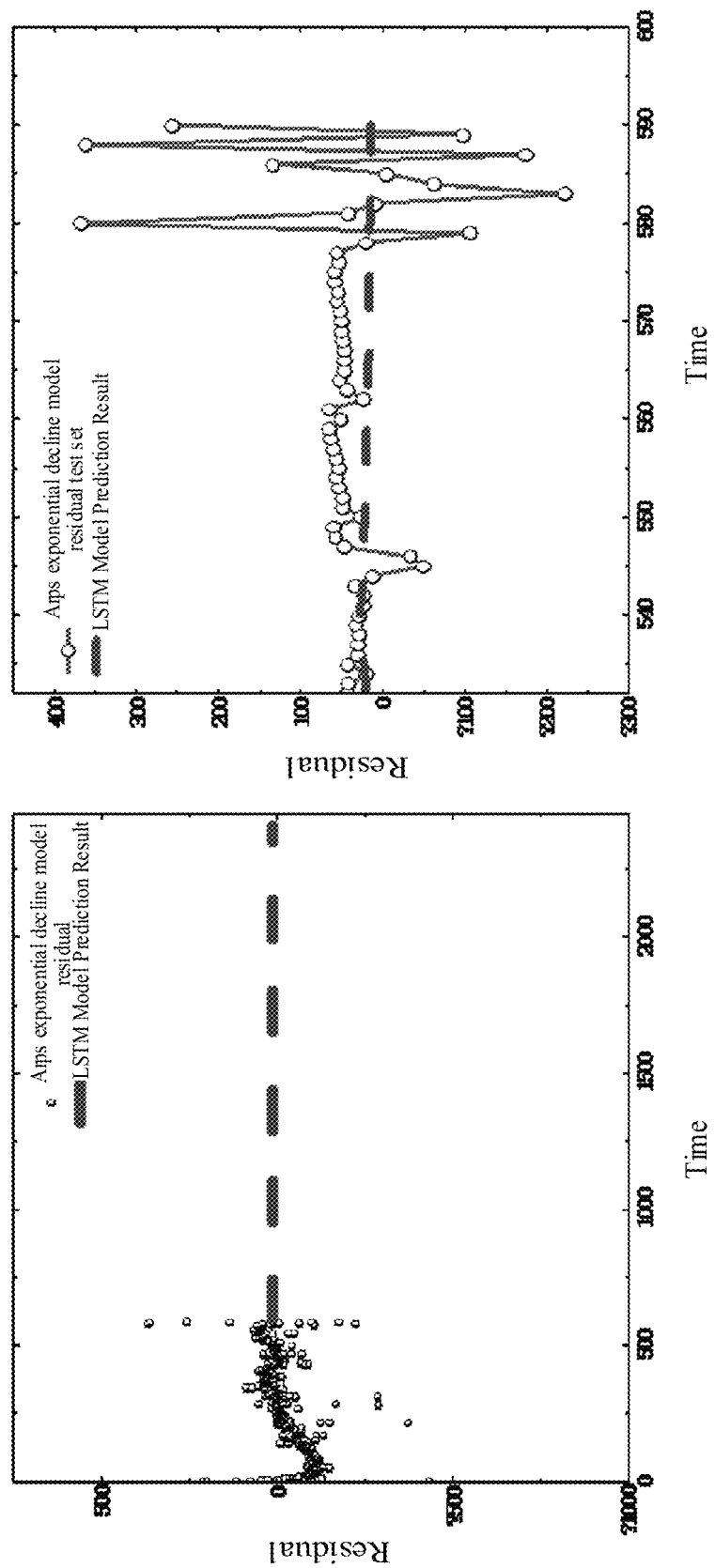
FIG. 11 is a graph of a residual prediction result of an Arps hyperbolic decline model according to some embodiments of the present disclosure.
Figure 12:
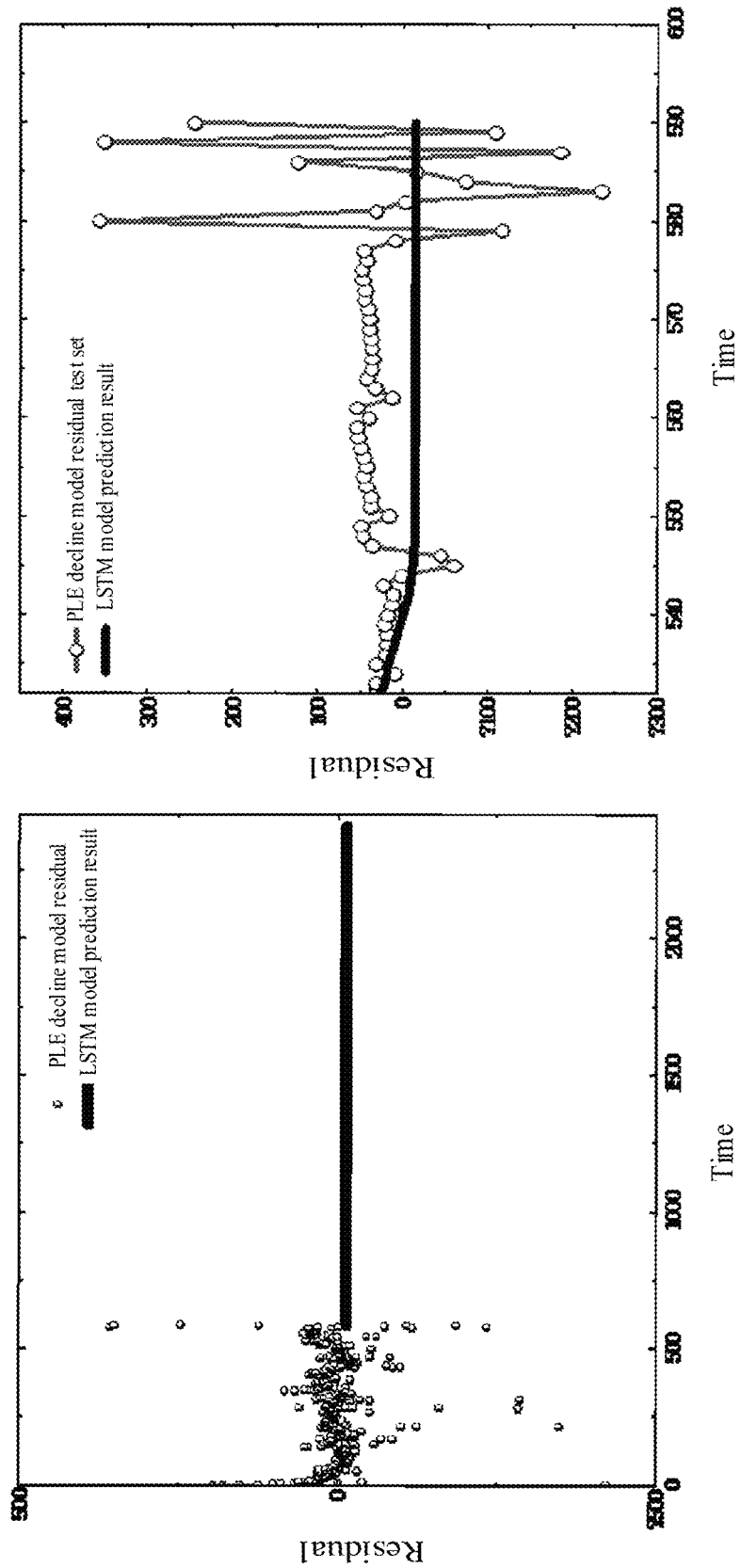
FIG. 12 is a graph of a residual prediction result of a PLE decline model according to some embodiments of the present disclosure.

A time step of 5 years is set to obtain a prediction result of a linear production trend of each model, as shown in FIG. 8.

After the prediction results of the production decline curve models are obtained, the LSTM network architecture is constructed and training options are specified. Initial settings of the LSTM models are shown in Table 1 and Table 2, wherein initial parameter settings are as follows: sequenceInputLayer=1, 1stmLayer=100, fullyConnectedLayer=1, and MaxEpochs=50.

Residuals between fitted curves obtained by the production decline curves and a real production curve are calculated respectively according to the fitting data of the production decline curve models, the residuals are standardized, the standardized residuals are used as the input of the LSTM model, and the initial values of the number of the hidden units and the number the training rounds of the LSTM models are set for residual fitting. The parameters are adjusted to achieve the best-fitting effect, and the optimal parameters of the LSTM models are shown in Table 5.

TABLE 5

| Model | Optimal Parameters |
|---|---|
| Duong Decline Model | 1stmLayer = 100; MaxEpochs = 100 |
| Arps Exponential Decline Model | 1stmLayer = 175; MaxEpochs = 100 |
| Arps Hyperbolic Decline Model | 1stmLayer = 125; MaxEpochs = 75 |
| PLE Decline Model | 1stmLayer = 175; MaxEpochs = 75 |

Figure 13:
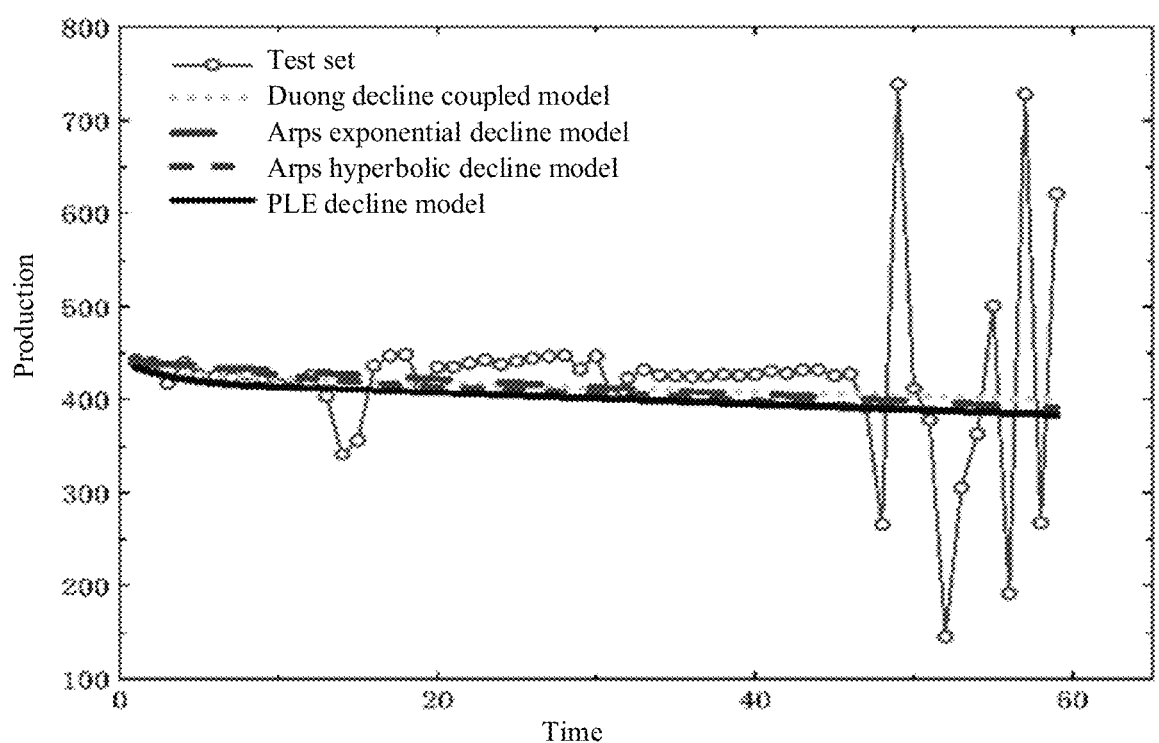
FIG. 13 is a graph of prediction results of a coupled model according to some embodiments of the present disclosure.
Figure 14:
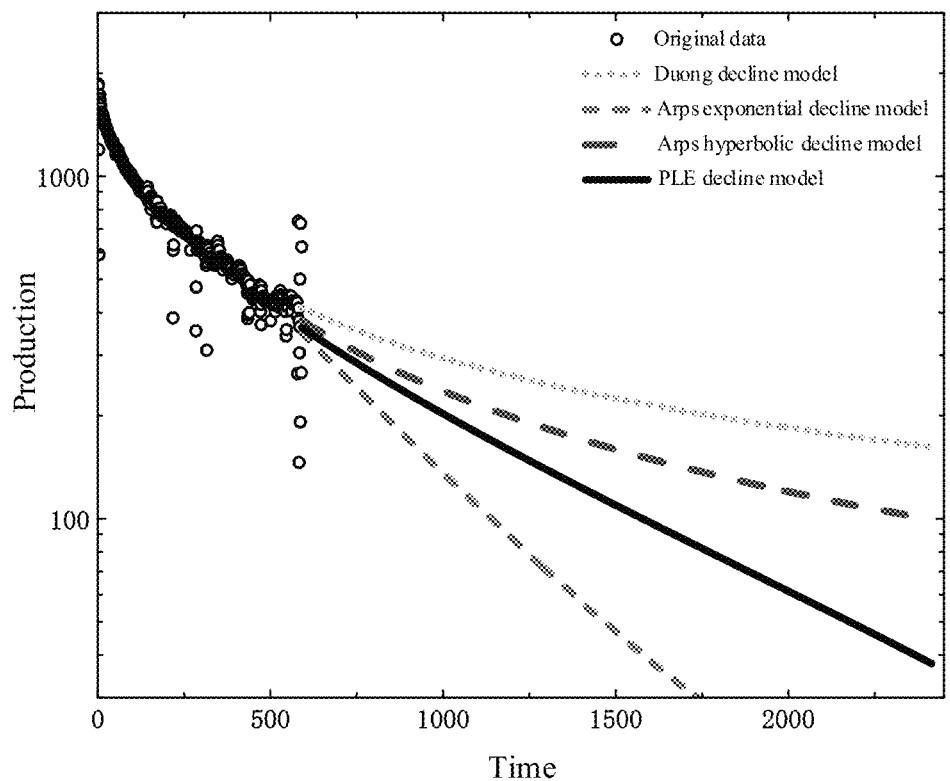
FIG. 14 is a graph of five-year prediction results of a coupled model according to some embodiments of the present disclosure.

Residual prediction of each model is completed with the time step of 5 years according to the parameters obtained based on the best fitting results, the prediction results being shown in FIGS. 9 to 12. The prediction results obtained by the production decline curves and the residual prediction results obtained by the LSTM models are added to obtain the prediction results of the final coupled models, which are verified with the test set, and the results are shown in FIG. 13. The prediction is completed with the time step of 5 years, and the prediction results of the coupled models of the production decline curve models and the LSTM models are shown in FIG. 14. The prediction errors of the coupled models are shown in Table 6.

TABLE 6

| Model | Average Relative Error |
|---|---|
| Duong Decline Model | 13.57% |
| Arps Exponential Decline Model | 13.83% |
| Arps Hyperbolic Decline Model | 13.54% |
| PLE Decline Model | 14.37% |

It can be seen that by calculating the residuals between the fitted curves obtained by the production decline curves and the real production curve, that is, the nonlinear fluctuations in the production curves, and predicting the residuals with the LSTM models, the present disclosure can solve the problem that the nonlinear fluctuations of the production curves cannot be predicted by the production decline curves, resulting in deviation of the prediction results; and the prediction results of the production decline curves and the residual prediction results of the LSTM models are added to obtain the final prediction results, which is beneficial to improving the accuracy of production prediction of the shale gas well.

Figure 15:
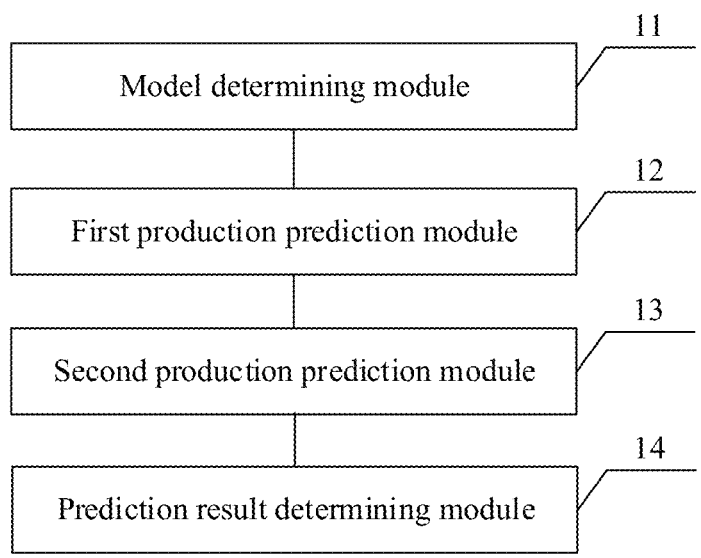
FIG. 15 is a schematic structural diagram of an apparatus for shale gas production prediction according to some embodiments of the present disclosure.

Referring to FIG. 15, some embodiments of the present disclosure further disclose an apparatus for shale gas production prediction. The apparatus includes:
a model determining module 11, configured to acquire real shale gas production data of a shale gas well to be subjected to production prediction, and determine a target production decline curve model for production prediction of the shale gas well to be subjected to production prediction according to the real shale gas production data;
a first production prediction module 12, configured to set a time step for production prediction of the shale gas well to be subjected to production prediction, and obtain a linear production decline curve corresponding to the shale gas well to be subjected to production prediction by performing production prediction on the shale gas well to be subjected to production prediction by using the target production decline curve model based on the time step;
a second production prediction module 13, configured to determine target shale gas production residuals according to the linear production decline curve and the real shale gas production data, input the target shale gas production residuals into a long short-term memory, and obtain a residual prediction result by performing production prediction according to the long short-term memory and the time step; and
a prediction result determining module 14, configured to determine a target production prediction result of the shale gas well to be subjected to production prediction based on the linear production decline curve and the residual prediction result, and verify the target production prediction results by using a preset test set corresponding to the shale gas well to be subjected to production prediction.

In the embodiments, firstly, the real shale gas production data of the shale gas well to be subjected to production prediction is acquired, and the target production decline curve model for production prediction of the shale gas well to be subjected to production prediction is determined according to the real shale gas production data; the time step for production prediction of the shale gas well to be subjected to production prediction is set, and the linear production decline curve corresponding to the shale gas well to be subjected to production prediction is obtained by performing production prediction on the shale gas well to be subjected to production prediction by using the target production decline curve model based on the time step; the target shale gas production residuals are determined according to the linear production decline curve and the real shale gas production data, the target shale gas production residuals are input into the long short-term memory, and the residual prediction result is obtained by performing production prediction according to the long short-term memory and the time step; and finally, the target production prediction result of the shale gas well to be subjected to production prediction is determined based on the linear production decline curve and the residual prediction result. It can be seen that in the embodiments, the production decline curve is used to predict the linear trend of production to calculate the residuals between the production decline curve and the real data, and then the long short-term memory is used to predict the residuals that characterize the nonlinear fluctuations. Shale gas production prediction is performed by constructing the production decline curve and the machine learning coupled model, which is beneficial to improving the effect of shale gas production prediction.

In some embodiments, the model determining module 11 specifically includes:
a model determining unit, configured to determine an initial production decline curve model for production prediction of the shale gas well to be subjected to production prediction according to the real shale gas production data, wherein a model parameter of the initial production decline curve model is a preset initial parameter; and
a data fitting unit, configured to fit the real shale gas production data by using the initial production decline curve model based on the initial production decline curve model, so as to determine a target model parameter according to a fitting result, and to determine a target production decline curve model corresponding to the target model parameter.

In some embodiments, the second production prediction module 13 further includes:

a production curve determining unit, configured to determine a real shale gas production curve based on the initial production decline curve model and the real shale gas production data of the shale gas well to be subjected to production prediction, so as to determine the target shale gas production residuals according to the linear production decline curve and the real shale gas production curve.

In some embodiments, the second production prediction module 13 specifically includes:

a residual processing module, configured to standardize the target shale gas production residuals and input them into the long short-term memory; and a first production prediction unit, configured to obtain an initial prediction result by performing production prediction according to the long short-term memory and the time step, and obtain the residual prediction result by anti-standardizing the initial prediction result.

In some embodiments, the second production prediction module 13 further includes:

a model setting unit, configured to set initial values of the number of hidden units and the number of training rounds of a corresponding model of the long short-term memory, so as to obtain the residual prediction result by performing production prediction according to the corresponding model of the long-short memory and the time step.

In some embodiments, the second production prediction module 13 specifically includes:

a parameter adjusting unit, configured to fit the target shale gas production residuals according to the long short-term memory, and adjust a memory parameter corresponding to the long short-term memory according to a residual fitting result; and a second production prediction unit, configured to determine the adjusted long short-term memory based on the adjusted memory parameters, and obtain the residual prediction result by performing production prediction according to the adjusted long short-term memory and the time step.

In some embodiments, the prediction result determining module 14 specifically includes:

a prediction result summing unit, configured to obtain the target production prediction result of the shale gas well to be subjected to production prediction by summing a linear prediction result corresponding to the linear production decline curve and a nonlinear prediction result corresponding to the residual prediction result.

Figure 16:
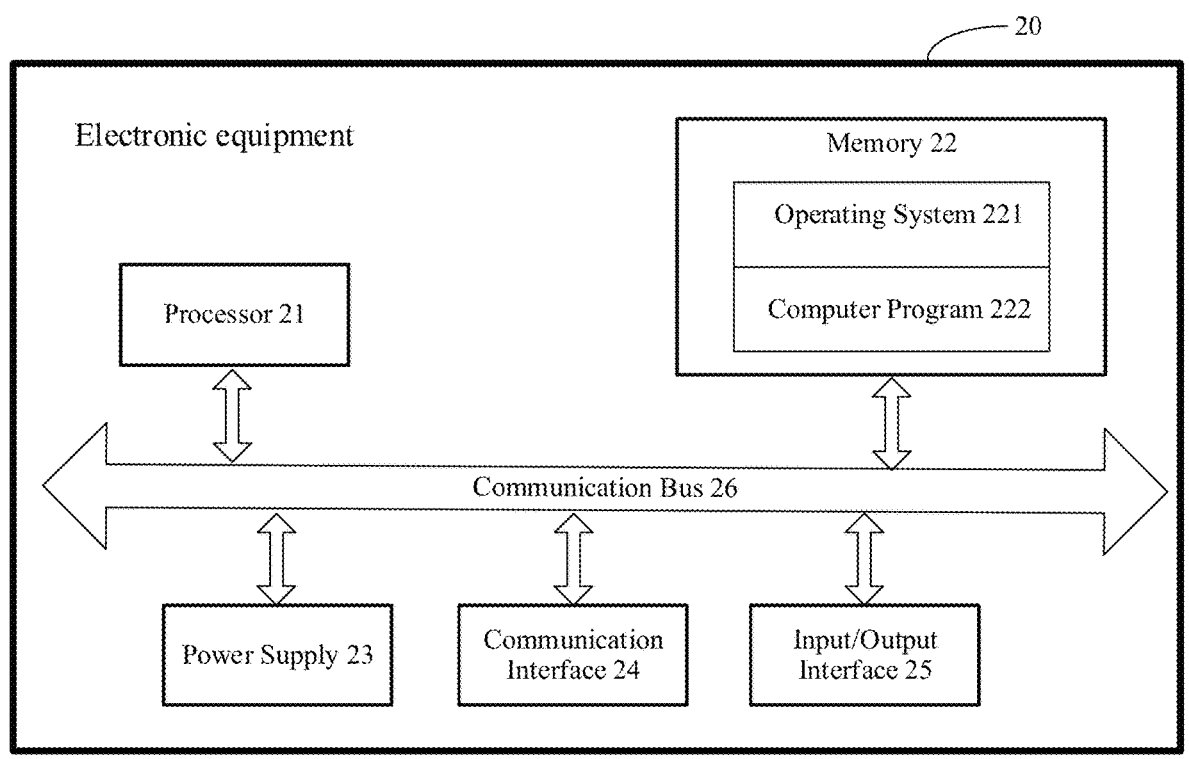
FIG. 16 is a structural diagram of an electronic device according to some embodiments of the present disclosure.

Some embodiments of the present disclosure further disclose an electronic device. FIG. 16 is a structural diagram of an electronic device 20 according to an exemplary embodiment, and the content in FIG. 16 cannot be regarded as any limitation on the scope of use of the present disclosure.

FIG. 16 is a structural diagram of an electronic device 20 according to some embodiments of the present disclosure. The electronic device 20 includes: at least one processor 21, at least one memory 22, a power supply 23, a communication interface 24, an input/output interface 25, and a communication bus 26, wherein the memory 22 is configured to store one or more computer programs, wherein the one or more computer programs, when loaded and executed by the processor 21, cause the processor 21 to perform in the method for shale gas production prediction disclosed by any of the above-mentioned embodiments. Furthermore, the electronic device 20 in the embodiments may be an electronic computer in particular.

In the embodiments, the power supply 23 is configured to provide a working voltage for hardware devices on the electronic device; the communication interface 24 may create a data transmission channel between the electronic device 20 and an external device, and the communication protocol it follows is any communication protocol that can be applied to the technical solutions of the present application, which is not limited specifically herein; and the input/output interface 25 is configured to acquire data input from the outside or output data to the outside, and its specific interface type can be selected according to specific application needs, which is not limited in particular herein.

Furthermore, as a carrier of resource storage, the memory 22 can be a read-only memory, a random memory, a disk or an optical disc, and the like, resources stored thereon may include an operating system 221, the computer program 222, and the like, and the storage mode thereof can be temporary storage or permanent storage.

The operating system 221 is configured to manage and control various hardware devices on the electronic device 20 and the computer program 222, and maybe Windows Server, Netware, Unix, Linux, or the like. The computer program 222 may further include a computer program that can be used for completing other specific work in addition to the computer program that can be used for performing the method for shale gas production prediction executed by the electronic device 20 disclosed by any of the above-mentioned embodiments.

Furthermore, the present disclosure further provides a non-transitory computer-readable storage medium for storing one or more computer programs, wherein the one or more computer programs, when loaded and executed by the processor, cause the processor to perform the above-mentioned method for shale gas production prediction. The specific steps of the method may refer to the corresponding content disclosed in the above-mentioned embodiments, and will not be repeated here.

The embodiments in this specification are described in a progressive manner, each embodiment focuses on its differences from the other embodiments, and the same or similar parts of the embodiments can be seen from one another. Since the device disclosed by the embodiment corresponds to the method disclosed by the embodiments, it is described relatively simply. For relevant details refer to the description in the method section.

It can be further appreciated by those skilled in the art that the units and algorithm steps of the examples described in connection with the embodiments disclosed herein can be implemented in electronic hardware, computer software, or a combination of the two. To clearly illustrate the interchangeability of hardware and software, the components and steps of the examples have been described in general according to functions in the foregoing description. Whether these functions are performed by hardware or computer software driven hardware depends on the particular applications and design constraints of the technical solutions. Those skilled in the art can implement the described functions for each particular application by different methods, but such implementation should not be considered beyond the scope of the present disclosure.

The steps of the method or algorithm described in the embodiments disclosed herein can be implemented directly with hardware, a software module executed by the processor, or a combination of the two. The software module may be placed in a random access memory (RAM), a memory, a read-only memory (ROM), an electrically programmable ROM, an electrically erasable programmable ROM, a register, a hard disk, a removable disk, a CD-ROM, or any other form of storage medium known in the technical field.

Finally, it should be noted that the relational terms herein, such as first and second, are used only to distinguish one entity or operation from another, and do not necessarily require or imply any such actual relationship or sequence between those entities or operations. Furthermore, the term "including", "containing" or any other variant thereof is intended to cover non-exclusive inclusion, so that a process, method, article or device that includes a series of elements includes not only those elements, but also other elements that are not expressly listed, or that are inherent to such process, method, article or device. Without more limitations, the elements defined by the phrase "including a . . . " do not exclude the existence of other elements in the process, method, article, or device that include the elements.

The technical solutions provided by the present disclosure are introduced in detail above. Specific examples are used herein to illustrate the principles and implementations of the present disclosure. The description of the above embodiments is only used to help understand the method of the present disclosure and its core idea thereof. Meanwhile, for those of ordinary skill in the art, there will be changes in the specific implementations and application scope based on the ideas of the present disclosure. In summary, the content of the specification should not be understood as a limitation of the present disclosure.

What is claimed is:

1. A method for shale gas production prediction, executed by a processor, comprising:

acquiring real shale gas production data of a shale gas well to be subjected to production prediction, and determining a target production decline curve model for production prediction of the shale gas well to be subjected to production prediction according to the real shale gas production data, wherein the shale gas well to be subjected to production prediction is a shale gas well which needs to be subjected to predicting production, and the real shale gas production data is shale gas production corresponding to each of past several years obtained by exploiting the shale gas well to be subjected to production prediction;

setting a time step for production prediction of the shale gas well to be subjected to production prediction, and obtaining a linear production decline curve corresponding to the shale gas well to be subjected to production prediction by performing production prediction on the shale gas well to be subjected to production prediction by using the target production decline curve model based on the time step, wherein performing production prediction on the shale gas well to be subjected to production prediction by using the target production decline curve model indicates that obtaining shale gas production corresponding to each of future several years by using the target production decline curve model;

determining target shale gas production residuals according to the linear production decline curve and the real shale gas production data, inputting the target shale gas production residuals into a long short-term memory, and obtaining a residual prediction result by performing production prediction according to the long short-term memory and the time step;

determining a target production prediction result of the shale gas well to be subjected to production prediction based on the linear production decline curve and the residual prediction result, and verifying the target production prediction result by using a preset test set corresponding to the shale gas well to be subjected to production prediction; and using the target production prediction result to adjust at least one of subsequent development or deployment of the shale gas well or a new shale gas well;

wherein said determining the target production decline curve model for production prediction of the shale gas well to be subjected to production prediction according to the real shale gas production data comprises:

determining an initial production decline curve model for production prediction of the shale gas well to be subjected to production prediction according to the real shale gas production data, wherein a model parameter of the initial production decline curve model is a preset initial parameter; and fitting the real shale gas production data by using the initial production decline curve model based on the preset initial parameter of the initial production decline curve model, so as to determine a target model parameter according to a fitting result, and to determine the target production decline curve model corresponding to the target model parameter.

2. The method for shale gas production prediction according to claim 1, wherein prior to determining the target shale gas production residuals according to the linear production decline curve and the real shale gas production data, the method further comprises:

determining a real shale gas production curve based on the initial production decline curve model and the real shale gas production data of the shale gas well to be subjected to production prediction, so as to determine the target shale gas production residuals according to the linear production decline curve and the real shale gas production curve.

3. The method for shale gas production prediction according to claim 1, wherein said inputting the target shale gas production residuals into the long short-term memory comprises:

standardizing the target shale gas production residuals and inputting the standardized target shale gas production residuals into the long short-term memory; and correspondingly, said obtaining the residual prediction result by performing production prediction according to the long short-term memory and the time step comprises:

obtaining an initial prediction result by performing production prediction according to the long short-term memory and the time step, and obtaining the residual prediction result by anti-standardizing the initial prediction result.

4. The method for shale gas production prediction according to claim 1, wherein upon inputting the target shale gas production residuals into the long short-term memory, the method further comprises:

setting initial values of the number of hidden units and the number of training rounds of a corresponding model of the long short-term memory, so as to obtain the residual prediction result by performing production prediction according to the corresponding model of the long-short memory and the time step.

5. The method for shale gas production prediction according to claim 4, wherein said obtaining the residual prediction result by performing production prediction according to the long short-term memory and the time step comprises:

fitting the target shale gas production residuals according to the long short-term memory, and adjusting a memory parameter corresponding to the long short-term memory according to a residual fitting result; and determining the adjusted long short-term memory based on the adjusted memory parameter, and obtaining the residual prediction result by performing production prediction according to the adjusted long short-term memory and the time step.

6. The method for shale gas production prediction according to claim 1, wherein said determining the target production prediction result of the shale gas well to be subjected to production prediction based on the linear production decline curve and the residual prediction result comprises:

obtaining the target production prediction result of the shale gas well to be subjected to production prediction by summing a linear prediction result corresponding to the linear production decline curve and a nonlinear prediction result corresponding to the residual prediction result.

7. An electronic device, wherein the electronic device comprises a processor and a memory configured to store one or more computer programs, wherein the one or more computer programs, when loaded and executed by the processor, cause the processor to perform the method for shale gas production prediction as defined in claim 1.

8. A non-transitory computer-readable storage medium storing one or more computer programs therein, wherein the one or more computer programs, when loaded by a processor, cause the processor to perform the method for shale gas production prediction as defined in claim 1.

* * * * *